(12) United States Patent
Glennon et al.

(10) Patent No.: US 9,659,052 B1
(45) Date of Patent: May 23, 2017

(54) DATA OBJECT RESOLVER

(71) Applicant: Amazon Technologies, Inc., Reno, NV (US)

(72) Inventors: Barry Dean Glennon, St Neots (GB); David Spike Palfrey, Cambridge (GB); William Tunstall-Pedoe, Cambridge (GB); Duncan Joseph Reynolds, Cambridge (GB); Petra Elisabeth Holmes, Over (GB); Gregory Christopher Doran, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 524 days.

(21) Appl. No.: 14/038,098

(22) Filed: Sep. 26, 2013

(51) Int. Cl.
*G06F 17/30* (2006.01)

(52) U.S. Cl.
CPC .. *G06F 17/30386* (2013.01); *G06F 17/30607* (2013.01)

(58) Field of Classification Search
CPC .................................................. G06F 17/30569
See application file for complete search history.

(56) References Cited

U.S. PATENT DOCUMENTS

| | | | | |
|---|---|---|---|---|
| 2009/0037488 A1* | 2/2009 | Abrams | ............ | G06F 17/30569 |
| 2012/0078612 A1* | 3/2012 | Kandekar | ........... | G06F 17/2745 704/9 |
| 2012/0179692 A1* | 7/2012 | Hsiao | ................ | G06F 17/30716 707/748 |
| 2012/0278297 A1* | 11/2012 | Yin | ...................... | G06N 99/005 707/706 |
| 2013/0179440 A1* | 7/2013 | Gordon | .................. | G06Q 30/02 707/731 |

* cited by examiner

*Primary Examiner* — Mohammad S Rostami
(74) *Attorney, Agent, or Firm* — Pierce Atwood LLP

(57) ABSTRACT

A system and method to recognize and resolve when a source data object is the same or similar to an existing data object in a database using structured information and facts about each object. The system and method compare relations of the source data object and relations of the existing data object in the database and determine how similar the source data object is to the data object in the database based on scores of the comparisons. The system and method may provide outputs, such as whether the data objects match, the data objects are distinct, the source data object is a strong match to multiple data objects in the database, and the data objects conflict one another. The system and method may then resolve the database entries based on the potential matching outputs.

21 Claims, 10 Drawing Sheets

DATA OBJECT RESOLVER

BACKGROUND

With the advancement of technology, the use and popularity of electronic devices, such as smart phones, has increased considerably. People are often interested in searching and obtaining information via the Internet. In general, information may be stored in one or more databases for retrieval by a search engine in response to a search. The information stored in these database(s) may be stored using natural language and/or potentially lexical knowledge about natural language elements. This approach allows a wide domain of knowledge to be stored. However, this approach can be limited in that a number of information objects within the databases(s) may be similar or duplicated.

BRIEF DESCRIPTION OF DRAWINGS

For a more complete understanding of the present disclosure, reference is now made to the following description taken in conjunction with the accompanying drawings.

DETAILED DESCRIPTION

Figure 1:
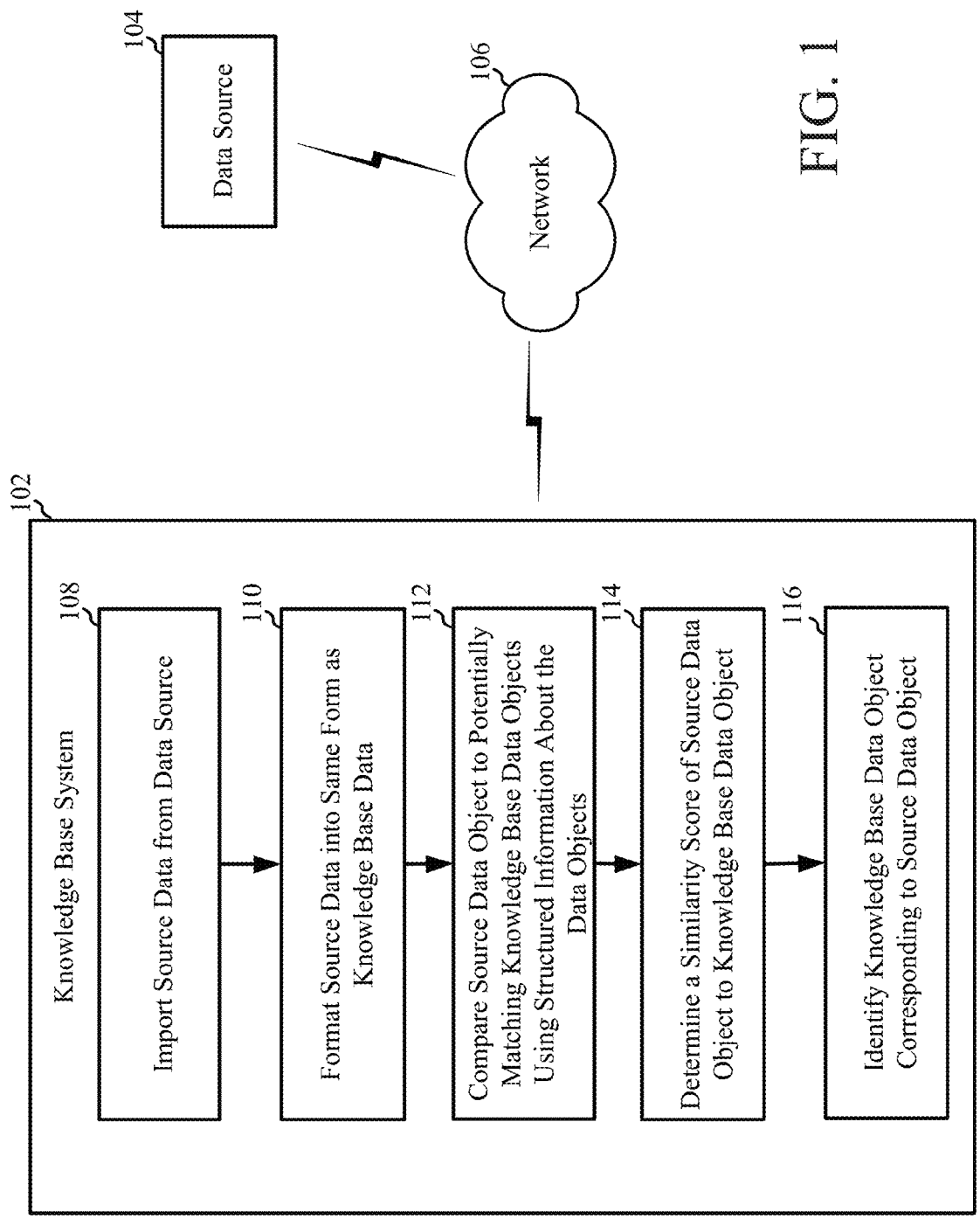
FIG. 1 illustrates a pictorial diagram of a method and system for resolving objects according to an aspect of the present disclosure.

When a new data source is imported into a knowledge database(s), such as a knowledge database that aggregates data from numerous different sources, the new data source may include data objects that represent objects that are already stored in the knowledge database(s). The new data objects may be entirely repetitive of information already in the knowledge base or may contain additional information that may be merged with the existing data. The knowledge database(s) may include information about the data objects in a structured form. In this aspect, the present disclosure describes systems and methods that can recognize and/or resolve when data objects are the same or similar, using structured information about each object. In an aspect, the present disclosure describes systems and methods that can determine what and how similar a new source data object is to data objects that are already present in the knowledge database(s) and aggregate the information in the objects if appropriate.

For example, if a new source object is imported from a source that sells music albums, the systems and methods can determine whether the proposed new album is already represented in the knowledge database(s). The systems and methods not only enable the finding of a list of potentially matching candidates in the knowledge databases(s), but also identify how similar in degree the new source data object and the existing data objects are with respect to their properties (for example, a musician, when the album was created, album category, etc.). As another example, a new data source of musicians might contain Madonna. In this example, the present systems and methods can recognize that she's the same person as the one already stored in the knowledge database(s). Thus, the system can avoid duplicating her appearance in the existing database when importing from the new database. As yet another example, when a collection of cities is being imported, one city may be called "Cambridge" and located in the US. The present systems and methods can recognize that the US "Cambridge" is different than, for example, a city called "Cambridge" located in the UK. The systems and methods can also be used, for example, to curate the existing knowledge database(s) to identify duplicate objects within the knowledge database(s).

The systems and methods also have numerous applications in external database systems, for example, a web service may implement the systems and methods and allow third party systems to query whether two objects are likely to be the same and/or provide an ID for an object which might be the same. Without the systems and methods disclosed herein, the risk of duplicating many objects in a knowledge database is high because it is unknown to a sufficient degree of granularity what, if any, similarity there may be between new source objects and objects in the existing knowledge database. The systems and methods can also allow users to import or match objects in their database to an external source. For example, a customer that sells books may desire to import information about a number of non-English novels from another source into its database, and the customer may desire to know whether it already has those objects represented to avoid listing or storing duplicates. By using the systems and methods, matches between a particular non-English novel and its English language counterparts can be identified and provided. The result is that rather than listing two separate and duplicate books, the customer can now list one book in different languages. The systems and methods may also allow third party systems to query the system to identify data objects that exist in structured form in any database.

FIG. 1 illustrates an exemplary implementation of the systems and methods according to aspects of the disclosure. As illustrated, a knowledge base system 102 is in communication with a data source 104, such as a third party data source, over a network 106, such as the Internet. The knowledge base system 102 may import, illustrated as block 108, one or more source data objects from the data source 104. The knowledge base system 102 formats or represents, illustrated as block 110, a source data object as a set of facts where the knowledge or information is represented in the same form as data objects in the knowledge base system 102. In an aspect, the knowledge base system 102 represents data objects in a structured form using various classifiers, recognition data, relations, classes, data/document objects, facts, time, negative facts, and other categories of knowledge.

The knowledge base system 102 compares, illustrated as block 112, the source data object to the data objects in the knowledge base system 102, based on the structured information corresponding to the objects. A similarity score is generated, illustrated as block 114, based on the similarity of the source data object to the data objects in the knowledge base system 102. When the similarity score is above a threshold limit, the source data object may already exist in the knowledge base system 102 and the knowledge base data object corresponding to the source data object may be identified, illustrated as block 116.

In an aspect, the knowledge base system 102 may be a knowledge representation system, for example, as described in U.S. Pat. No. 7,013,308, filed on Nov. 21, 2001, in the name of Tunstall-Pedoe; U.S. Pat. No. 7,707,160, filed on Dec. 23, 2005, in the name of Tunstall-Pedoe; U.S. Pat. No. 8,219,599, filed on Oct. 17, 2011, in the name of Tunstall-Pedoe; and/or U.S. patent application Ser. No. 13/106,562, filed on May 12, 2011, in the names of Overell et al., the contents of all of which are hereby incorporated herein by reference in their entireties and collectively referred to below as the Incorporated Knowledge System documents. In this aspect, the data or information in the knowledge base system 102 is stored in a structured form, such as a form described in the Incorporated Knowledge System documents. For example, the data or information in the knowledge base system 102 may be structured using various classifiers, such as objects, recognition data, relations, classes, data/document objects, facts, time, negative facts, the golden rule, categories of knowledge, etc. such as described in the Incorporated Knowledge System documents. The knowledge base system 102 may perform dynamic generation of classifiers and facts.

The knowledge base system 102 is also not limited to specific domains, for example, books, geography, people, etc., of knowledge bases and databases. The systems and methods are non-domain-specific methods for aggregating and identifying information about data objects which may or may not be domain-specific. For example a data object with the name "Madonna" may represent the musician, a book, film, or painting, all with the name "Madonna." Since the knowledge base is cross-domain, it can draw upon knowledge from other domains (e.g. geographical knowledge) to determine the difference between a musician born in Basildon and one born in the United States. In this aspect, the knowledge base system 102 can cross-reference one or more additional knowledge bases and databases.

In an aspect, the comparison step, illustrated as block 112, includes identifying an initial list of candidate data object matches in the knowledge base to the source data object, then finding all relation-side pairs used in facts corresponding to the source data object. A relation-side pair is a relation, for example, [is the parent of], together with information about which side the data object is on, for example, the data object is on a left side when the relation claims the object is a parent of something, and the data object is on a right side when the relation claims that something is a parent of the object.

For each potential matching relation-side pair of a data object in the list of candidate matches, the knowledge base system 102 may set an initial positive score and negative score to zero. The positive score represents an amount of evidence that the objects match, and the negative score represents an amount of evidence that the objects do not match. Additionally, a weight value representing the strength of the evidence considered may be set to zero. Then, for each relation-side pair, the knowledge base system 102 looks at the values that the source data object and the data object in the knowledge base system 102 take for that relation-side pair. Using the sets of values, together with the properties of the relation-side pair, the knowledge base system 102 decides whether this evidence looks positive, negative, or conflicting, and how much weight it should carry, and combines this into the scores for positivity, negativity and weight. This weight may be different for each relation-side pair depending on the source of the information and/or other factors.

The knowledge base system 102 may analyze the scores and decide if enough evidence has been considered for a decision to be made about whether a data object in the knowledge base system 102 is a match for the source data object. If so, then the knowledge base system moves on to the next candidate data object match. The knowledge base system compares the scores for the candidates and decides whether a strong match has been found, the source data object is strongly likely to be a new object, or neither option is strongly indicated. In the latter case, the knowledge base system 102 may return additional details of the issue, for example, strong potential matches to multiple existing objects or highly conflicting information, which can potentially be useful later for manually resolving the object or cleaning the knowledge base system.

Figure 2:
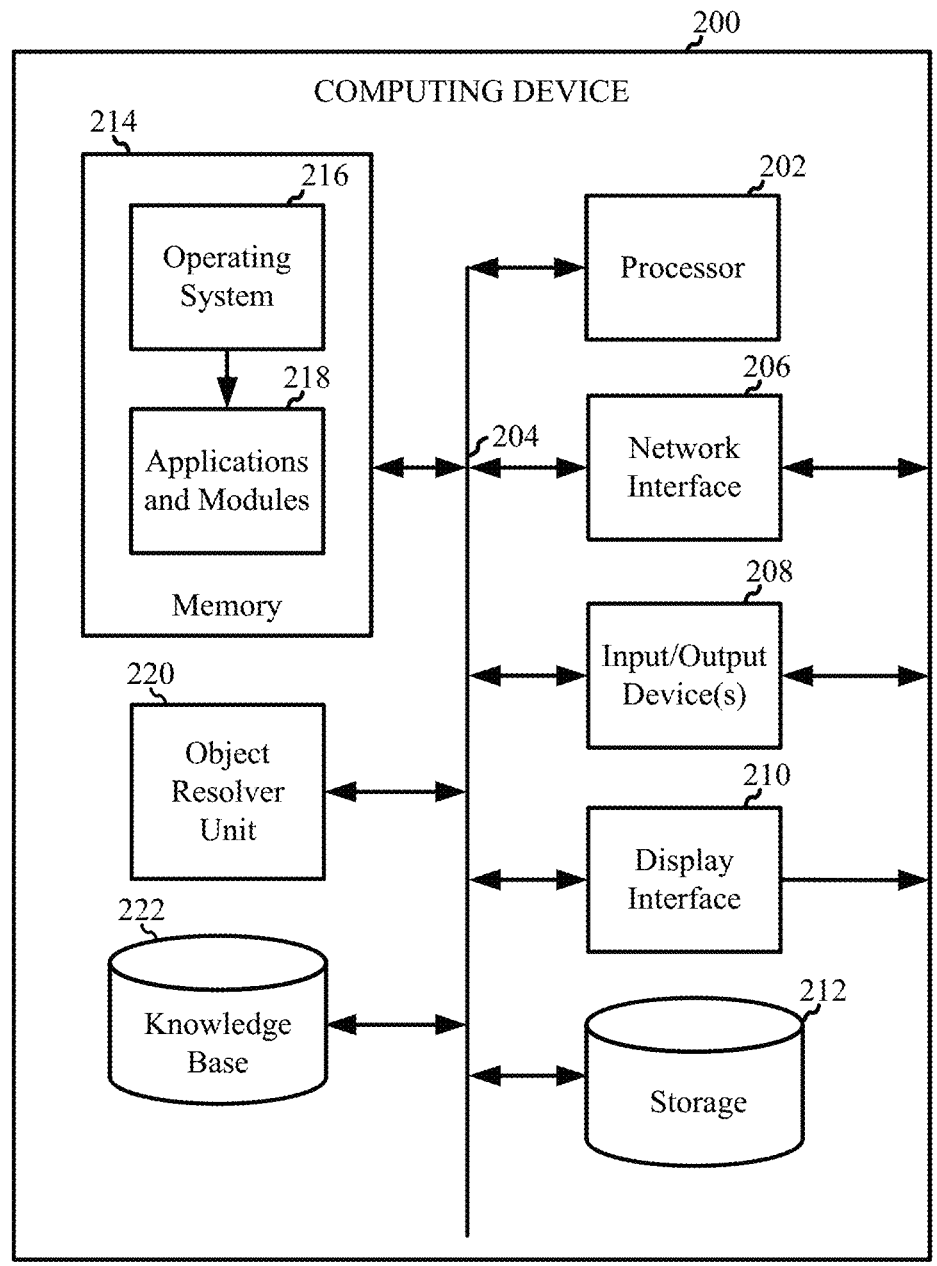
FIG. 2 is a block diagram conceptually illustrating a computing device according to an aspect of the present disclosure.

Aspects of the present disclosure may be implemented as a computer implemented method in a computing device or computer system. FIG. 2 illustrates an exemplary computing device 200, which may be part of the knowledge base system 102. The computing device 200 may include a processor 202 in communication with a variety of other components over a system bus 204 or through a direct connection. The other components may include, for example, a network interface 206, one or more input and/or output devices 208, a display interface 210, and a storage component 212. As appreciated by those skilled in the art, the network interface 206 enables the computing device 200 to communicate data, control signals, data requests, and other information with other resources including computers, data sources, storage devices, and the like, on a network such as the Internet. The network interface 206 may be configured to communicate via wired or wireless connections. For example, the network interface 206 may be configured to communicate via an Ethernet port, modem, etc. The network interface 206 may also be configured to communicate via a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, etc. As one skilled in the art should appreciate, the computing device 200 may receive an audio, image, text, video, and other inputs and transmit the input data to another computer, a storage device, or other source via the computer network, as well as save the input data to a networked location.

The input and/or output devices 208 enable the computing device 200 to obtain data input from a variety of devices including, but not limited to, a digital pen, a touch screen, a keyboard, a mouse, a scanner, a microphone, an inertial sensor, a video recorder, a camera and the like. In addition to the exemplary components described above, a display interface 210 may be used for outputting display information to a user. Typically, the display information is output by the display interface 210 via a display device (e.g., a screen or similar device). While not illustrated, one skilled in the art should appreciate that a display device may be incorporated as an integral element within a computing device 200 or may be separate therefrom.

The processor 202 may be configured to operate in accordance with programming instructions stored in a memory 214. The memory 214 generally comprises RAM, ROM, and/or other memory. Thus, in addition to storage in read/write memory (RAM), programming instructions may also be embodied in read-only format, such as those found in ROM or other permanent memory. The memory 214 may store an operating system 216 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 214 may also store user-executable applications and modules 218, or programs, for conducting various functions on the computing device 200. For example, the application(s) 218 in memory 214 may be configured according to aspects of the present disclosure to resolve data objects.

An object resolver unit 220 may be implemented in an application or module implemented on the computing device 200, in a plurality of cooperating applications/modules on the computing device 200, or in a plurality of cooperating applications and/or modules distributed over multiple computing devices 200 in a computer network, for example. Additionally, a knowledge base 222 for storing structured data objects may be incorporated as an integral element within the computing device 200 or may be separate therefrom.

The object resolver unit 220 may analyze and tag/format imported source data objects for processing by formatting the source data objects into the structured form of the knowledge base 222, for example, as described in the Incorporated Knowledge System documents. In an example, the object resolver unit 220 may format the source data objects into one or more corresponding classes, relations, data/document objects, facts, time, negative facts, categories, etc. The object resolver unit 220 may be based on the models and programming available to the object resolver unit 220. Such models may be grammar based, rule based, or constructed in a different manner. The object resolver unit 220 may also be configured to translate slang terminology, abbreviated terms, synonyms, and other queries into textual expressions that can be understood and used by the knowledge base 222.

Figure 3:
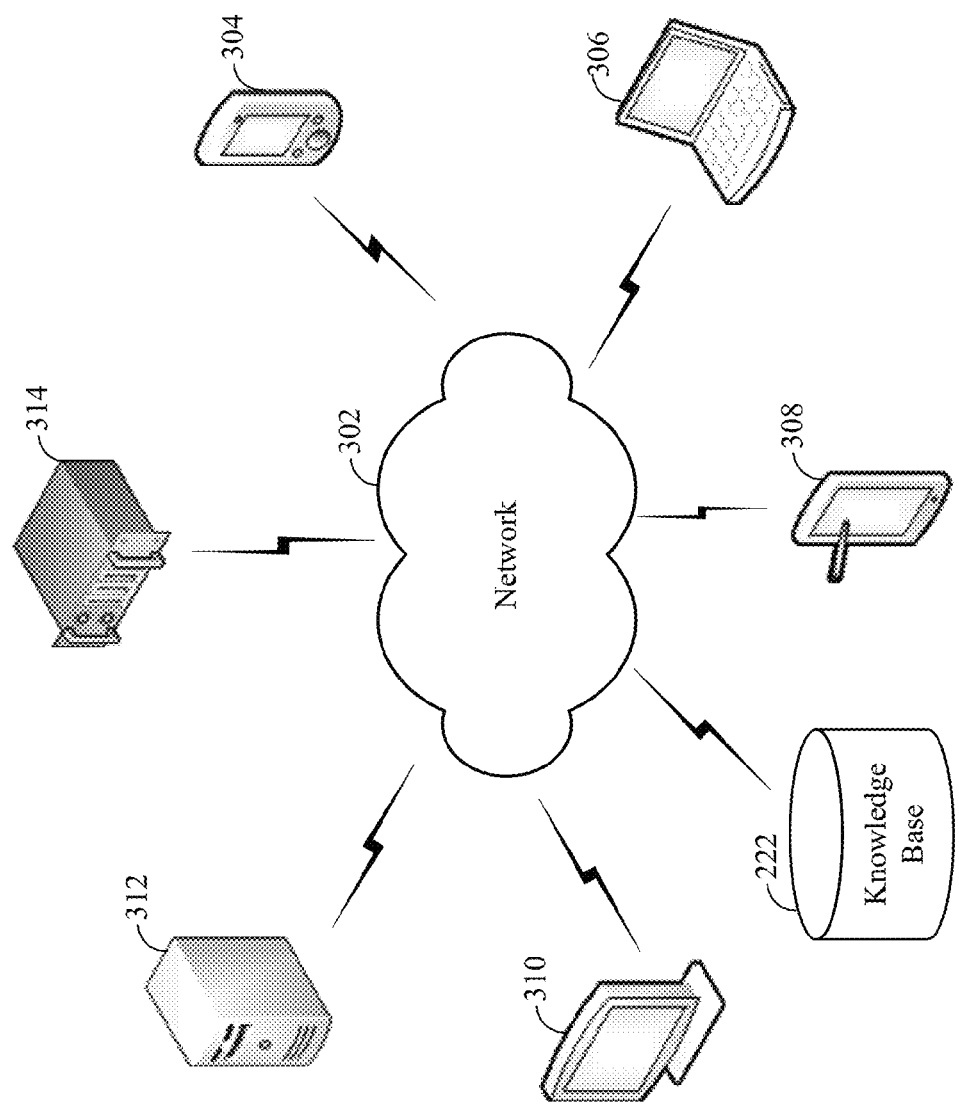
FIG. 3 illustrates a computing network for use with distributed processing according to an aspect of the present disclosure.

As described above, multiple devices may be employed. For example, the devices may include different components for performing different aspects of the methods disclosed herein. As illustrated in FIG. 3, multiple devices may be connected over a network 302. Network 302 may include a local or private network or may include a wide network such as the internet. Devices may be connected to the network 302 through either wired or wireless connections. For example, a wireless device 304 may be connected to the network 302 through a wireless service provider. Other devices, such as a desktop computer 310, may connect to the network 302 through a wired connection. Other devices, such as laptop 306 or tablet computer 308 may be capable of connection to the network 302 using various connection methods including through a wireless service provider, over a WiFi connection, or the like.

In certain configurations, one device may receive imported source data and other device(s) may perform the analysis and object resolving method and analysis. For example, source data may be received by knowledge base 222 and sent over the network 302 to computer 312 or server 314 for processing. In certain configurations, the object resolving methods can be parallelized to involve multiple devices.

In an aspect, the devices, systems, and methods provide for the recognition or resolution of when data objects, for example new data objects and existing data objects, are the same or similar, using structured information about each object. This can be used, for example, to prevent duplicate copies of objects from being imported into a knowledge base and curate the existing knowledge database to identify duplicate objects within the knowledge database. This also has numerous applications in external database systems, for example, a web service may implement the systems and methods and allow third party systems to query whether two objects are likely to be the same and/or provide an ID for an object which might be the same.

Figure 4:
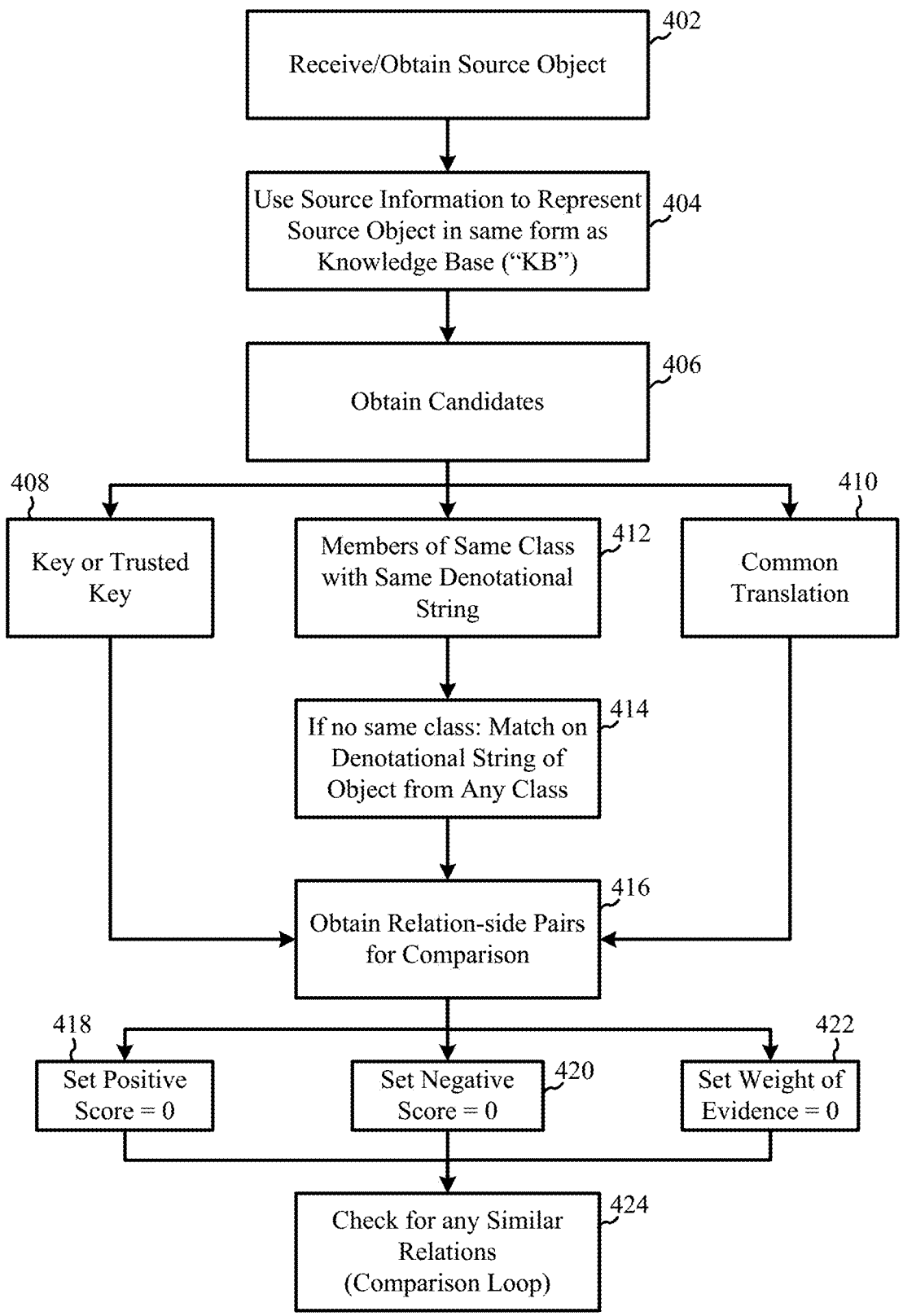
FIG. 4 illustrates a flow diagram of a method and system for resolving objects according to an aspect of the present disclosure.

FIG. 4 is a flow diagram illustrating an exemplary method for resolving data objects. One or more of the logical components of FIGS. 1-3 may perform the method of FIG. 4. In block 402, a new source data object is imported, obtained, or received. The source data object is formatted or represented as a set of facts in the same form as objects in the knowledge base it is being brought into, illustrated as block 404. An initial list of potential candidate data object matches to the source data object are identified, using one or more factors, such as the name of the object illustrated as block 406. The candidate matches may be selected based on sharing any one or more of a key or trusted key, illustrated as block 408; a common translation, for example a name they are normally referred to as, illustrated as block 410; or a denotational string, for example, a name, plus being members of a substantially same class, illustrated as block 412. If these do not provide enough similarity to find a respectable set of potential candidate matches then the search may be broadened by looking for any objects sharing a denotational string from any class, illustrated as block 414.

In general, a key is an identifier of a source of a data object. The key may be a name or other indicator that may be used to identify a particular object A trusted key is an identifier obtained by a data source that has demonstrated that it is a reliable source for the particular identifier. For example, a MusicBrainz ID associated with data being imported from MusicBrainz may be a trusted key for the data source of MusicBrainz. However, when the same data is being imported from a different source, such as Wikipedia, and the key is a MusicBrainz ID, the key may not be a trusted key because Wikipedia is not the authority associated with the key and it may be unknown whether the data is actually from MusicBrainz. In this respect, a trusted key may provide a better indicator than a non-trusted key and may be weighted higher in the comparison.

In an aspect, one or more relation-side pairs used in facts about the source data object are identified, illustrated as block 416. For each potential matching relation-side pair for each data object in the list of candidate matches an initial positive score is set to zero, illustrated as block 418, and an initial negative score is set to zero, illustrated as block 420. The positive score represents an amount of evidence supporting that the source data object matches a data object in the knowledge base, and the negative score represents an amount of evidence supporting that the objects do not match. Additionally, a weight value representing the strength of the evidence considered is set to zero, illustrated as 422. Optionally, the relations may be sorted in order of importance, so as to identify matches and non-matches in an efficient manner.

In an aspect, a relation-side pair of the source data object is compared to a potential matching relation-side pair of a data object identified in the list of candidate matches, illustrated as block 424. In an aspect, each relation-side pair is compared in a singular manner, for example, a first relation-side pair is compared, then a next relation-side pair is compared, etc. In this aspect, the comparison may loop through the potential matching relation-side pairs and the data objects identified in the list of candidate matches. The comparisons may also be performed in parallel, which may increase efficiency.

In general, a relation-side pair is a pair of relations for which a particular side is of interest. For example, when [Barack Obama] is the source data object, and [Barack Obama Sr] is the data object existing in the knowledge base, a potential relation may be [was born on]. In this example, the relation side for [was born on] is the right, because it is the value on the right side of the data object. Thus, a relation-side pair, means that a particular side relevant to the relation (for [was born on], the right side), is being looked at to see if they have the same value. Based on this example, there may be two values:

(1) [Barack Obama] [was born on] [timepoint: 1961]; and
(2) [Barack Obama Sr] [was born on] [timepoint: 1936].

The relation-side for [was born on] is the "right" side. Thus, the values (i.e., both timepoints in the example above) for the relation-side pair are compared. In this example, the values do not match. In other examples, the system may determine whether the relation-side pairs are substantially similar. That is, whether they are similar enough according to the system's comparison threshold to indicate the objects are similar. If they are, the system may indicate the objects are similar with a score, as described below.

The relation-side pair comparison may occur for all of the potential candidate data object matches to the source data object. For example, the potential candidate data object matches may include: (1) "Barack Obama" may match the object [Barack Obama], (2) "Barack Obama" may match the object [Barack Obama Sr], (3) "Barack Obama" may match the object [Barack Obama the book], (4) "Barack Obama" may match the object [Barack Obama the film], and others. In other words, when looking at "Barack Obama" it could mean a number of different things. Thus, a set of candidates is looked at, relation-side pair values are compiled and compared for the potential matches to the source data object to obtain a score for the [was born on] relation-side pair.

In this aspect, the comparing may include looping over each relation-side pair in a structured manner. The comparison may involve a certain level of inference, for example, take object A [is born on] X and object B [is created on] X. The relation for those pairs is different. However, it may be inferred that object A and object B are the same because [was created on] is a more general form of [was born on]. In this example, although the relations do not match exactly, they are close and the comparison may result in a score lower than if they were an exact match, but high enough to warrant further analysis. Thus, when comparing and analyzing relation-side pairs with a relation like the above the system may indicate that the relation-side pairs are too different to compare, or may indicate the relation-side pairs as matching or close enough when they are comparable (for example, when one relation is a more general form of another).

Figure 5:
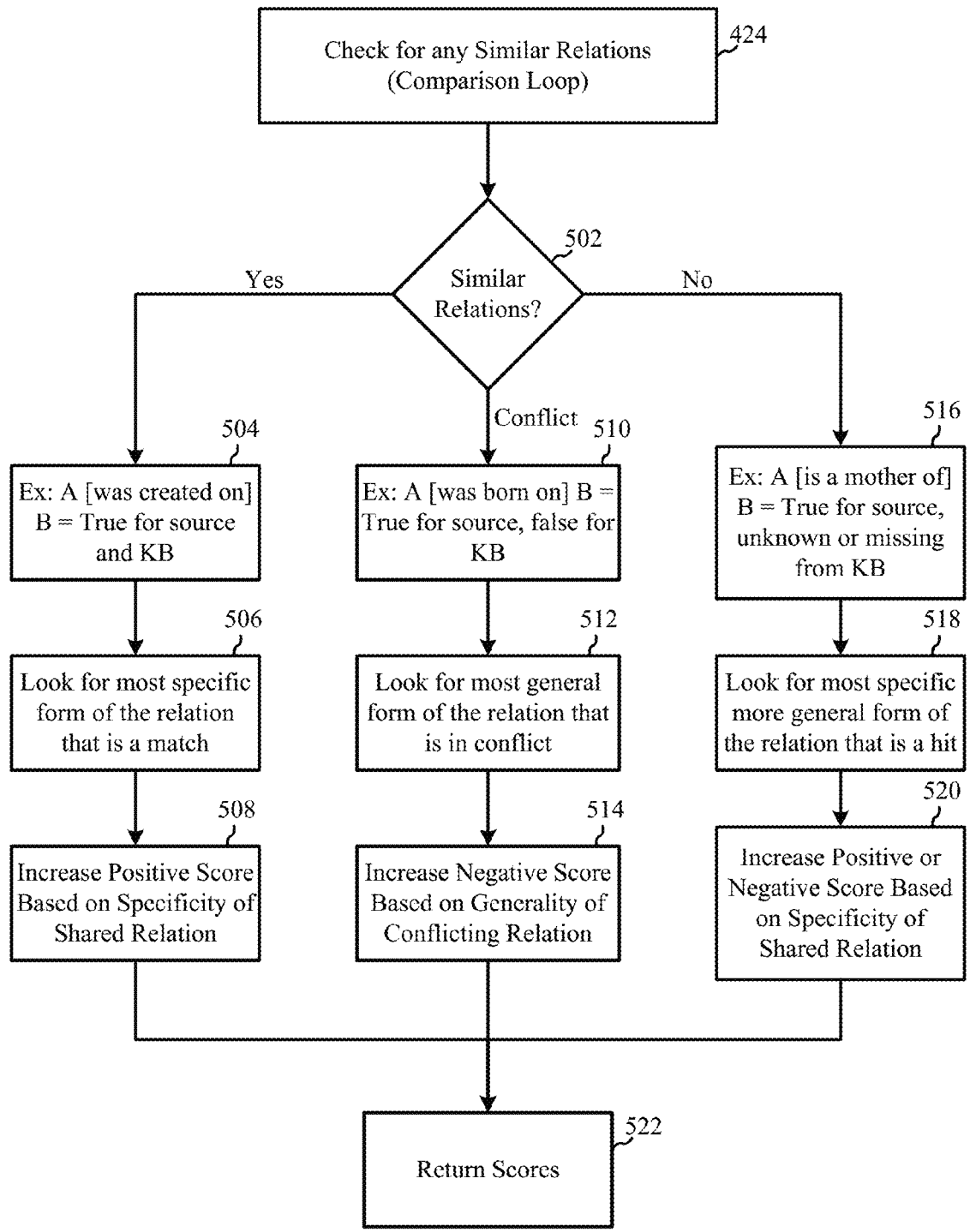
FIG. 5 illustrates a flow diagram of a method and system for comparing relations of objects according to an aspect of the present disclosure.

FIG. 5 is a flow diagram illustrating an exemplary method for comparing relation-side pairs between new objects and objects existing in the knowledge base. One or more of the logical components of FIGS. 1-3 may perform the method of FIG. 5. In this example, a relation-side pair of the source data object is compared to a potential matching relation-side pair of a data object identified in the list of candidate matches, illustrated as block 424. For each relation-side pair of the data object(s) identified in the list of candidate matches, a determination is made as to whether the values of a relation-side pair of the object in the knowledge base is similar to the values of a relation-side pair of the source data object, illustrated as block 502.

An example of a method for handling a similar relation-side pair is shown in blocks 504-508. In this example, the relation-side pair is [was created on], and the relation-side pair that the object A was created on date B is true for both the source data object and the data object in the knowledge base, illustrated as block 504. The most specific form of relation-side pair that is a match for the source data object and the data object in the knowledge base is identified, illustrated as block 506. For example, the relation-side pair [was created on] may be a general form of the relation-side pair, whereas, [was published on] is more specific. The positive score is increased based on the specificity of the shared relation-side pair, illustrated as block 508.

An example of a method for handling a conflicting relation-side pair is shown in blocks 510-514. In this example, the relation-side pair is [was born on], and the relation-side pair that the object A was born on date B is true for the source data object and false for the data object in the knowledge base, illustrated as block 510. The most general form of relation-side pair that is in conflict between the source data object and the data object in the knowledge base is identified, illustrated as block 512. For example, [was born on] Aug. 9, 2012 may be a specific relation-side pair, whereas [was born on] 2012 may be more general. The negative score is increased based on the generality of the conflicting relation-side pair, illustrated as block 514.

An example of a method for handling a non-similar relation-side pair is shown in blocks 516-520. In this example, the relation-side pair is [is a mother of], and the relation-side pair that the object A is a mother of B is true for the source data object and unknown or missing from the data object in the knowledge base, illustrated as block 516. The most specific relation-side pair that is a general form of a relation-side pair that is a match for the source data object and the data object in the knowledge base is identified, illustrated as block 518, and the positive score or the negative score is increased based on the specificity/generality of the shared relation-side pair, illustrated as block 520. For example, the relation-side pair [is a mother of] may be a more specific form of the general relation-side pair [is a parent of], which may also be a more specific form of the more general relation-side pair [is related to]. While there may not be enough information to determine that the source data object and the data object in the knowledge base share a specific relation-side pair [is a mother of], there may be enough information to determine that a more general relation-side pair, such as [is a parent of], is shared.

The comparison step is repeated for each potential matching relation-side pair for each data object candidate in the knowledge base. For each relation-side pair, the values, including the positive and negative values, are returned for the comparison of the source data object and the data object in the knowledge base, illustrated as block 522. Using the set of values together with the properties of the relation-side pairs, a decision is made as to whether this evidence is positive, negative, or conflicting, and how much weight it should carry. A combined score for each data object candidate in the knowledge base is generated by combining the scores for each relation comparison of that data object candidate. The scores for all the data object candidates are compared and a decision is made as to whether a match has been found, the source data object is a new object, or if neither behavior is correct. In the latter case, the method can return more details of the problem, for example, strong potential matches to multiple existing objects or highly conflicting information, which can potentially be useful later for manually resolving the object or cleaning the knowledge base.

Figure 6:
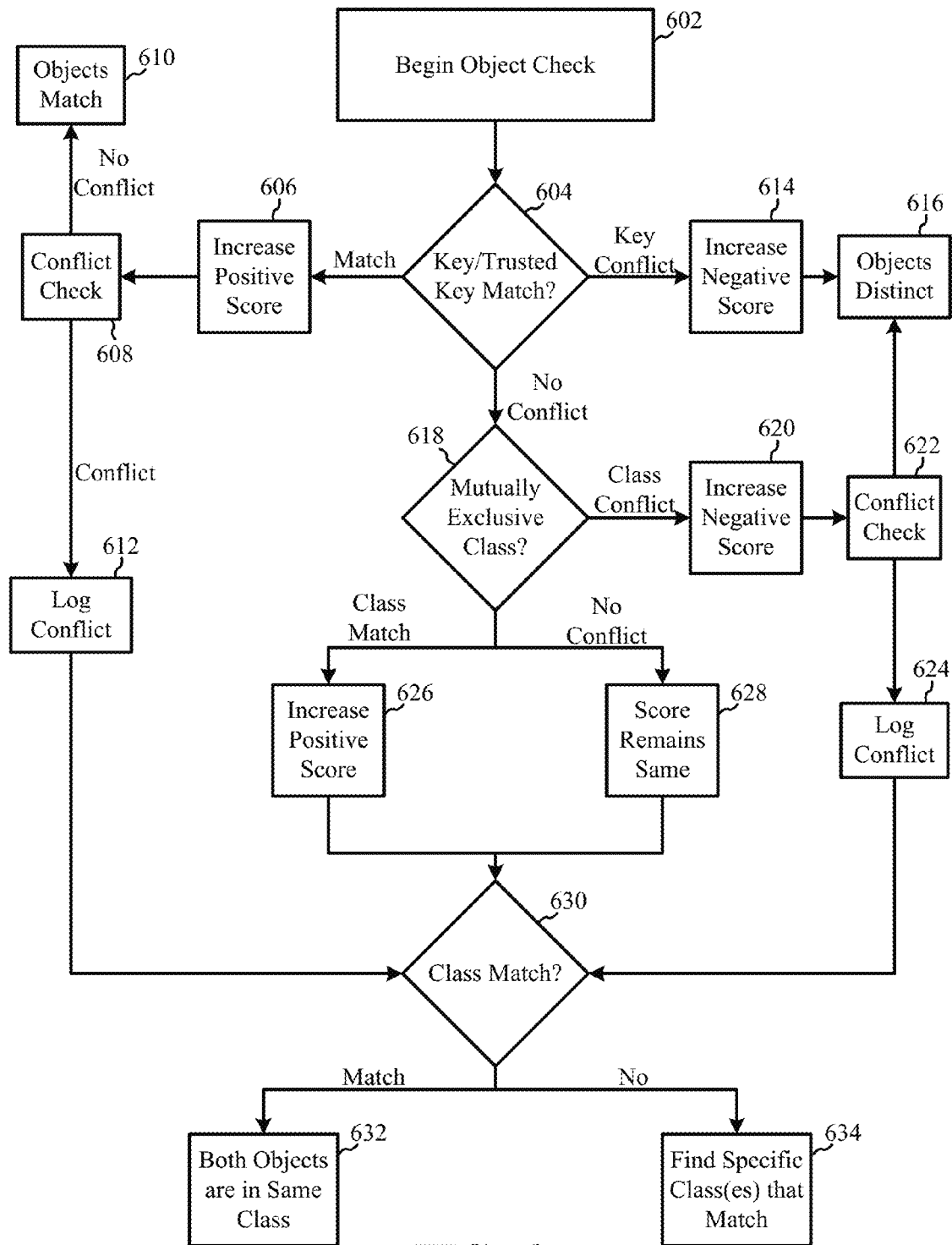
FIG. 6 illustrates a flow diagram of a method and system for performing a relations check according to an aspect of the present disclosure.

In an aspect, the new source data object may be compared to each of the data objects in the list of potential candidate data objects using the method illustrated in FIG. 6. The method of FIG. 6 may be part of the method described with reference to FIGS. 4A-4B, used alone or in combination with the other methods disclosed herein, and one or more of the logical components of FIGS. 1-3 may perform the method of FIG. 6. As illustrated in block 602, an object check begins. In this aspect, a determination is made as to whether the source data object and a data object in the knowledge base have a matching key or trusted key, illustrated as block 604. As described above, the key is generally an identifier of a source of a data object, and may be a trusted key, such as is a unique identifier assigned by a data source. For example, a MusicBrainz ID associated with data being imported from MusicBrainz may be a trusted key for the data source of MusicBrainz. However, when the same data is being imported from a different source, such as Wikipedia, and the key is a MusicBrainz ID, the key may not be a trusted key since Wikipedia is not the authority associated with the key and it may be unknown whether the data is actually from MusicBrainz. In this respect, a trusted key may provide a better indicator than a non-trusted key and may be weighted higher in the comparison.

When the keys match, the positive score is increased, illustrated as block 606. An example of the keys matching would be when both the source data object and the data object in the knowledge base, have a same MusicBrainz ID. Another example of a key is a particular uniform resource locator (URL), Wikipedia page, etc. associated with the object. If the source data object and the data object in the knowledge base are associated with the same unique URL, the positive score representing a potential match between the object may be increased. A conflict check may also be performed, illustrated as block 608, to check for irregularities or non-matching/conflicting facts or relations. When there is no conflict, it may be decided that the objects match, illustrated as block 610. On the other hand, when a conflict is identified, the conflict is logged, illustrated as block 612, and the process may proceed to a class match step, as described in further detail below in relation to block 630.

When the keys conflict, the negative score is increased, illustrated as block 614, and it may be decided that the objects are distinct and non-matching, illustrated as block 616. When the keys do not match and do not conflict, the system checks for any mutually exclusive classes between the data object in the knowledge base and the source object, illustrated as block 618. When it is determined that there is a class conflict, the negative score is increased, illustrated as block 620, and a conflict check may be performed, illustrated as block 622. For example, if two data objects, both called Madonna are compared and one has a class of singer and the other has a class of celebrity, there may be no conflict between the classes as an object may be both a singer and a celebrity. Thus, the two objects may be the same. However, on the other hand, if the classes are human being and biography, there may be a conflict between the classes as it is unlikely for an object to be both a human being and a literary work, such as a biography. Thus, the objects may not be the same. If the conflict check identifies no conflict for the determination that the classes conflict, it may be decided that the objects are distinct and non-matching, illustrated as block 616. On the other hand, when a conflict is identified, the conflict is logged, illustrated as block 624, and the process may proceed to a class match step, as described in further detail below in relation to block 630.

When it is determined that the classes are not mutually exclusive, i.e., there is all or a part of overlap between the classes, the positive score is increased, illustrated as block 626. When it is determined that there is no conflict between the classes, the scores remain the same, illustrated as block 628. The process then proceeds to block 630. As illustrated in block 630, a class match is performed. When the classes of the source data object and the data object in the knowledge base match, both the source object and the data object in the knowledge base are in the same class, illustrated as block 632. Continuing to FIG. 7, when source object and the data object in the knowledge base are in the same class, illustrated as block 632, the positive score is increased, illustrated as block 702, and the next relation/class relation is compared and the scores are updated, illustrated as block 704.

Figure 7:
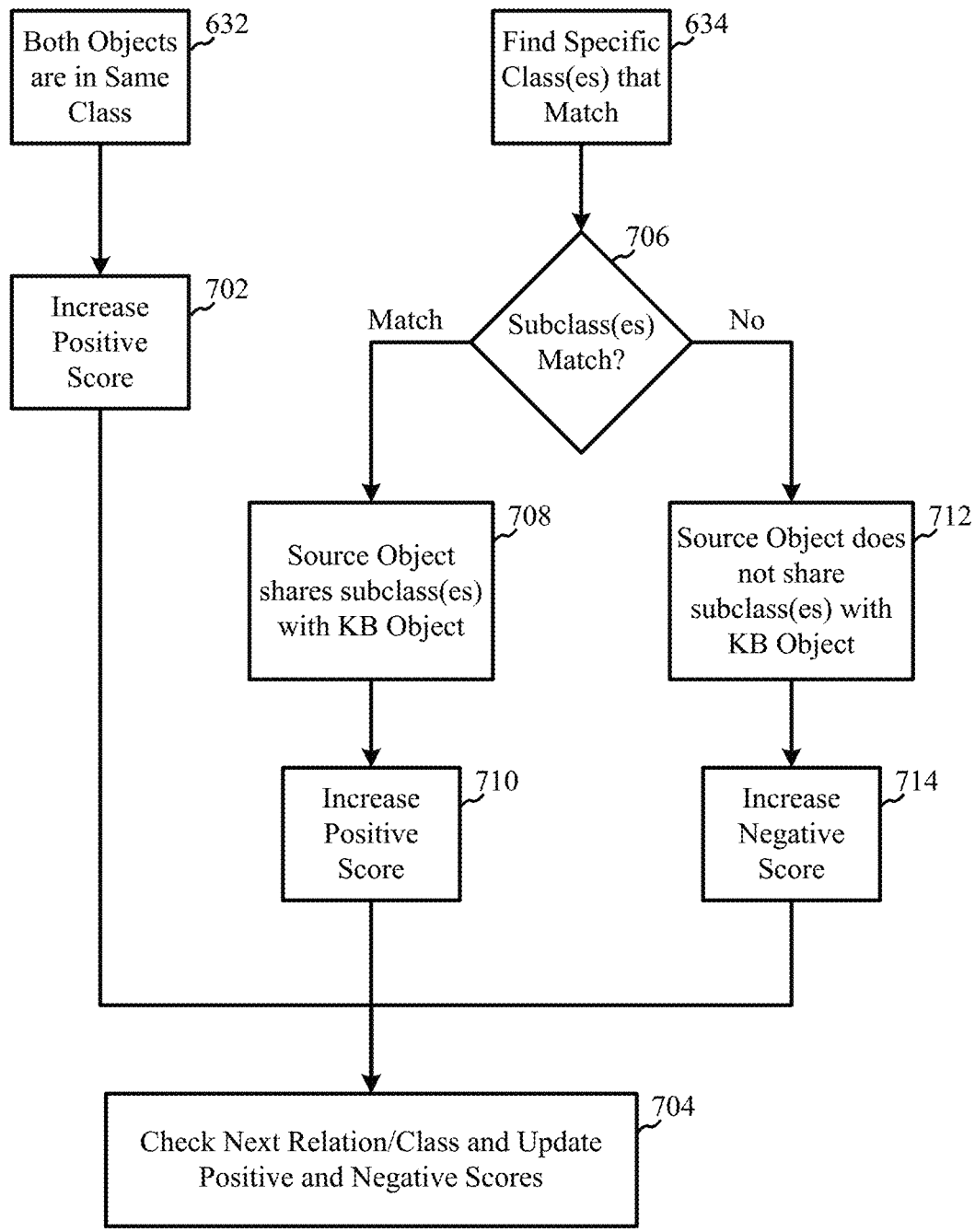
FIG. 7 illustrates a flow diagram of a method and system for comparing class relations of objects according to an aspect of the present disclosure.

When the classes do not match, a check for other classes that may match between the source object and the data object in the knowledge base is performed, illustrated as block 634. As illustrated in FIG. 7, a check for matching subclass(es) may be performed, illustrated as block 706. Using the example where the data object is Madonna and the classes are singer and celebrity, the class singer may be a subclass of celebrity and thus a subclass match may be identified. When a matching subclass is found, the source data object shares a subclass with the data object in the knowledge base, illustrated as block 708, and the positive score is increased, illustrated as block 710. The next relation/class relation may then be compared and the scores are updated, illustrated as block 704. When no matching subclass is found, the source data object does not share a subclass with the data object in the knowledge base, illustrated as block 712, and the negative score is increased, illustrated as block 714. The next relation/class relation may then be compared and the scores are updated, illustrated as block 704.

Figure 8:
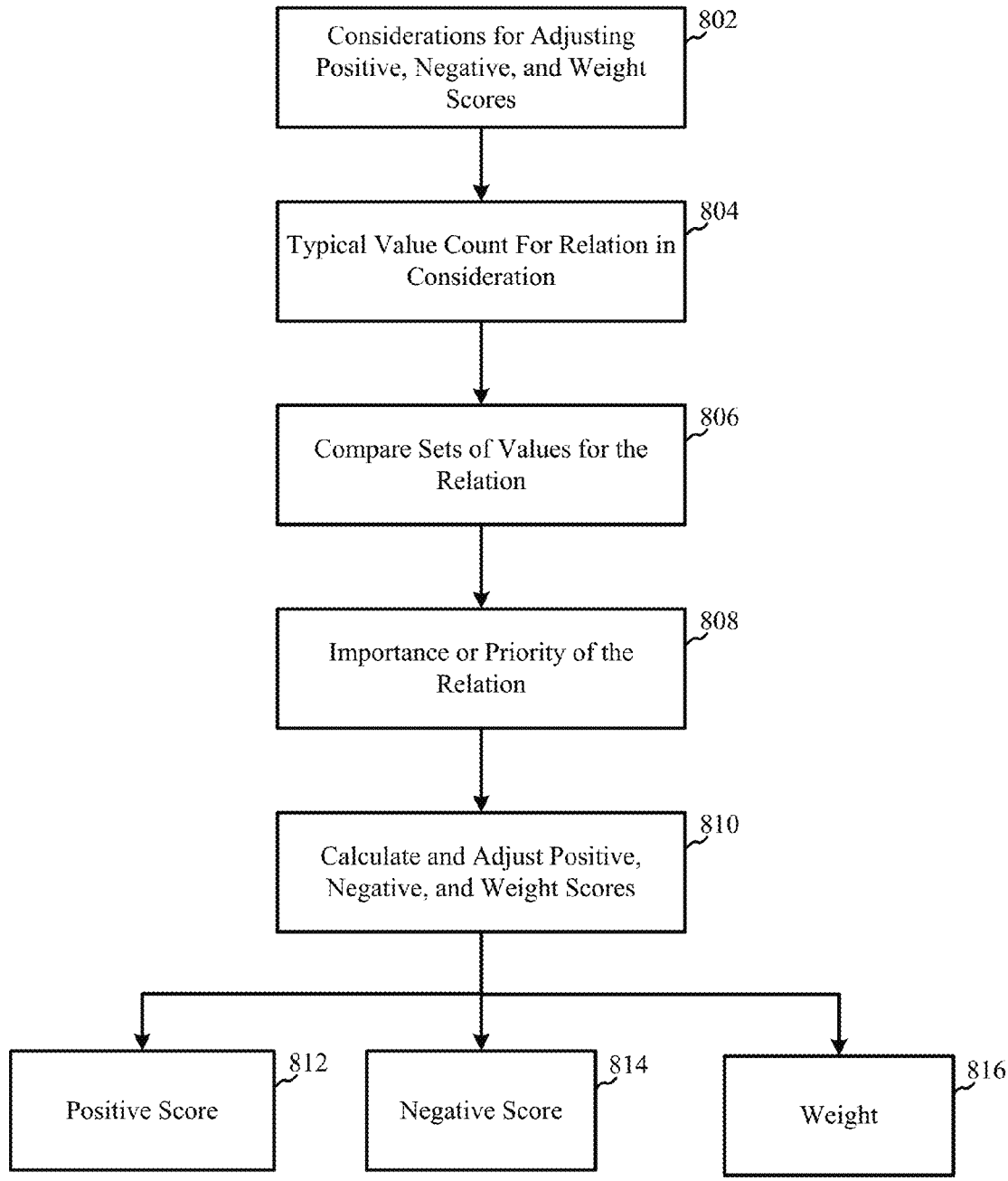
FIG. 8 illustrates a flow diagram of a method and system for adjusting scores of objects according to an aspect of the present disclosure.

As described above, the positive score represents an amount of evidence supporting that the source data object matches a data object in the knowledge base, the negative score represents an amount of evidence supporting that the objects do not match, and the weight value represents the strength of the evidence. The adjustment, including increasing and decreasing, of these scores based on the methods above may take into account one or more considerations. FIG. 8 shows a number of considerations for use in adjusting the positive and negative scores and the weight, illustrated as block 802. For example, suppose a source data object "X" has values a, b and c for a relation-side pair "R", and a data object "Y" in the knowledge base has values a, d and e. Then, as the objects "X" and "Y" are hypothetically merged, the resulting object "XY" includes values a, b, c, d and e. A decision about whether this is a good hypothetical merge is based on the considerations discussed below.

In block 804, a typical value count for the relation in consideration is considered. In this aspect, statistical features of the distribution of the number of values which a relation-side pair takes for a typical value count are considered. A value may be calculated for how many values a relation-side pair typically takes for "R" ("typical_valcount"). Continuing the example, above, the object "XY" has five values (a through e). This number of values may be too large, based on the object, suggesting the objects should not be merged, or the number may be so small as to be meaningless in comparison to the total value expected. For example, if object "X" and object "Y" are chain stores and a, b, c, d and e are towns where stores object "X" and object "Y" have branches, then this information may be low-impact because many chain stores have five or more branches. On the other hand, if object "X" and object "Y" are people and a, b, c, d, and e are universities that object "X" and object "Y" had graduated from, then object "X" and object "Y" may be unlikely to be the same person since few people have graduated from five universities.

Whether any of the values are basically the same is also considered. For example, if d=15 and e=15.00001, then d and e may be combined. In this aspect, although the object "XY" has five values, two of the values are so close that object "XY" may be considered to have only four values. This closeness may be a measure of the "goodness" of the pair of values.

A measure of the impact of two objects sharing a value "R" is also considered. In an aspect, for relations that are far from right/left unique, their contribution may depend on the frequency of the fact pattern in the knowledge base. For example, if object "X" and object "Y" both [commonly translates as] ["Tom Smith"], this may contribute less than if object "X" and object "Y" both [commonly translates as] ["Petunia Zulu"]. As another example, sharing a nationality may be a low indicator that the objects are the same, because a number of people share a nationality. However, sharing a mother may be a higher indicator that the objects are the same, because a modern western mother rarely has more than six children, and no mother has ever had more than for example, one-hundred children. This number may be referred to as a "typical_other_valcount" for "R." In one aspect, the "typical_other_valcount" for a relation-side pair "R"-left should be equal to "typical_valcount" for the corresponding pair "R"-right, in which the object is on the other side of the relation.

In block 806, a weight of sets of values associated with the shared relation in consideration is considered. For example, if the shared relation is unique for each object on either the right or left side of the relation, the relation may receive a higher weight than a relation that has multiple objects where the relation is true. A measure of how unique a relationship is may be referred to as a "uniqueness." In an aspect, a measure of how likely the values in the data objects are to be complete and correct is considered. For example, subjective relations are often poor indicators of similarity or conflict. In this example, there may be a city in one source with a fact "the Eiffel tower is the best tourist attraction in X" and in another source says "the best tourist attraction in Y is the Louvre." A city can only have one "best tourist attraction," but these two pieces of data should not necessarily be held as strong evidence for object "X" and object "Y" being different objects. This concept may be referred to as the relation-side pair "priority."

Sources of data may also be factored into the weight of a shared relation. For example, in comparing two objects where one is mined from a particular source, that source's trusted key may carry extra weight. This may be implemented by multiplying the "priority" for that relation-side pair by a factor, for example, 5.

In block 808, a priority of the shared relation in consideration is considered. In this aspect, a measure of a frequency of the values across all objects for that relation-side pair may be considered. Each value plus relation-side pair may have a fact pattern priority score based on the frequency of the values across all objects for that relation-side pair. For example, more people share a birth year than those sharing a precise birth date, and such relations should have differing priorities (e.g., the relation of a precise birth date may have a higher priority).

Strongly contradictory values may also be considered. Some relation-side pairs can take values that strongly contradict a match. For example, if X [is an instance of] C and Y [is an instance of] D, and we know that C and D are mutually exclusive classes, then this is much stronger negative evidence for a non-match than if membership of C and D was independent. One example of mutually exclusive classes may be the class "Movies" and the class "Recipes". An implementation of considering contradictory values may include using special-casing ([is an instance of], left) and ([applies to], right) because the knowledge base contains information about distinct classes and mutually exclusive attributes. Special-casing can also be used for permanent, unique relation-side pairs, for example, ([is the birthplace of], right) is unique and permanent, because a person cannot be born in multiple non-overlapping places. For example, a single person cannot be born in two different countries. In an aspect, this may be a special case for anti-reflexive relations (for example, one Barack Obama is a father of another Barack Obama).

In an aspect, temporal scope of a fact may be taken into consideration. For example, a fact asserting that Ronald Reagan was not president of the U.S. in the 1960s should not block a match with an object asserting that Ronald Reagan was president of the U.S. in the 1980s. Additionally, class-specific heuristics may be used. For example, in the [human being] class, census data can give accurate information about the relative rarity of the person's surname and first name in the U.S. during a certain time and this can be combined with other information to give a probability of a source object (person) being the same as an existing data object (person) entity.

Using the considerations described above, the positive and negative scores and the weights are calculated and adjusted, illustrated as block 810, and a positive score, illustrated as block 812, a negative score, illustrated as block 814, and a weight, illustrated as block 816 are determined. In one aspect, the adjustment/calculation may be split into two cases, one corresponding to a single value case, and corresponding to a multiple value case. In the single value case any disagreement between the values is a negative sign. When the values are "close enough": negativity=(1−goodness)*priority; otherwise negativity=priority. When there are any shared values, the positive score is added to, with weight equal to the fact pattern priority for the closest and most precise pair of shared values. Such "close enough" values may be calculated for scalar quantities, numerical values, dates, places, strings, and other types of relations.

In one aspect the positive score may have one weight and the negative score may have a different weight, depending on the relations compared to arrive at the respective weights. In another aspect, the overall comparison between objects (including both the positive and negative score) will have a single weight. In another aspect the positive and negative scores may be combined into a single score representing the likelihood that the compared objects correspond to the same entity, and the single score may have a weight. In still another aspect, the positive score, negative score, and any associated weights may all be combined into a single omnibus score indicating a likelihood that compared objects point to the same entity.

In the multiple value case, when there is some intersection between the values and the total number of values for both objects together is less than the typical_valcount, then it may be treated as a positive signal and the weight for the contribution is set as an aggregation operator, for example, (min(priority, #intersecting values*priority/typical_other_valcount)). When there is no intersection and the total number of values is greater than typical_valcount, the weight may be set as equal to the priority for purely negative signals. In other cases the weight may be set as a mild negative score, for example, weight=priority/typical_other_valcount.

Figure 9:
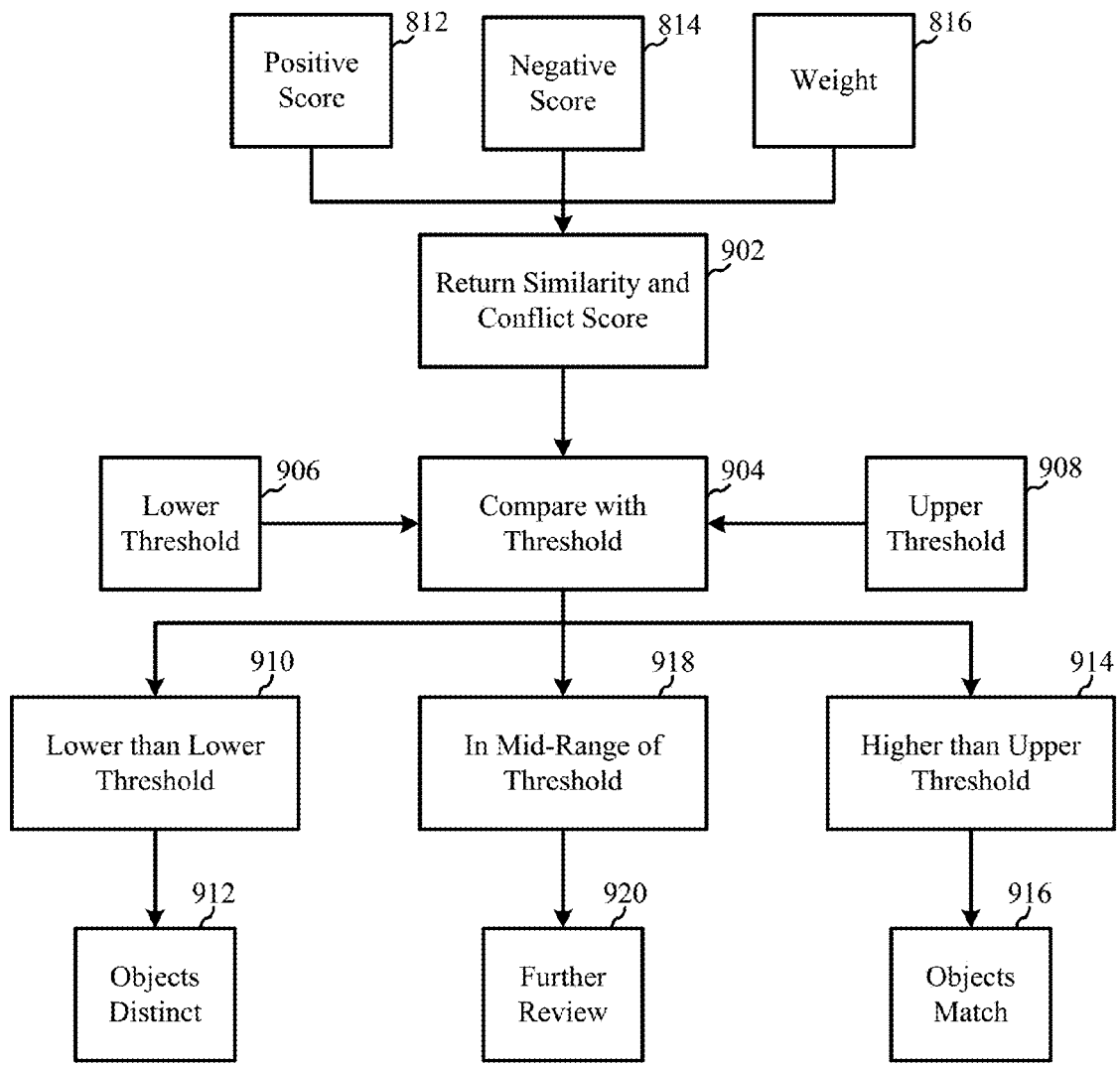
FIG. 9 illustrates a flow diagram of a method and system for resolving objects according to an aspect of the present disclosure.

Once the scores are determined, a determination may be made as to whether the source data object and the data object in the knowledge base match and provide an output. FIG. 9 illustrates a method providing such an output. One or more of the logical components of FIGS. 1-3 may perform the method of FIG. 9. As illustrated in blocks 812-816, total scores for the comparison of the source data object and the data object in the knowledge base is determined. To determine the total score, the positivity, negativity and weight from each contribution may be combined by summing the scores from each contribution. For example, if two people shared a denotational string and a parent but had different dates of birth, their scores would be as follows: Positivity=20 (from shared string)+70 (from shared parent); Negativity=80 (from different birthdate); and Weight=20+70+80.

In an aspect, a similarity score and a conflict score may be calculated based on the positive score, negative score, and weight, illustrated as block 902. For example, the similarity and conflict scores may be calculated as follows:

Similarity score=0.5 if weight<minimum threshold (i.e. not enough information)

Otherwise similarity score=(1+positivity−negativity)/weight

Conflict score=(max(positivity,negativity)−abs(positiviy−negativity))/weight, or (min/weight)

When these scores are strong, the method may exit early and generate an output. For example, if there is a high conflict score (indicating inconclusive results) or if weight is high with a high positivity or negativity and a low conflict (indicating strongly meaningful results).

In an aspect, the similarity score is a comparison vector based on similarity and conflict scores, and is compared to a threshold score, illustrated as block 904, for example, a lower threshold limit, illustrated as block 906, and an upper threshold limit, illustrated as block 908. When the similarity score is lower than the lower threshold limit, illustrated as block 910, the objects may be output as being distinct, illustrated as block 912. When the similarity score is higher than the upper threshold limit, illustrated as block 914, the objects may be output as matching, illustrated as block 916. Further, when the similarity score is between the upper and lower threshold limits, illustrated as block 918, the objects may be output as indicating a manual review, illustrated as block 920. The thresholds may be adjusted as desired when merging objects.

Other possible outputs may also result. For example, if the two objects are not a clear match or non-match/distinct, there are various possible causes including the object being a strong match to multiple other objects (suggesting the presence of duplicate objects in the knowledge base). Another potential output may be that there is too little information about the object to resolve it to another one, for example, if a source data object relating to a product called "green blouse" is being imported, with no other information, this may or may not be the same as any of the other green blouses. Another potential output may be that there is a conflict, for example, identifying there is a potential match "Y" that has both strong positive and strong negative signals, which may be caused by "Y" already being a bad object in some way. For example, an object called "Strawberry Fair" that was listed as both a song and an event, which are considered to be distinct classes.

Figure 10:
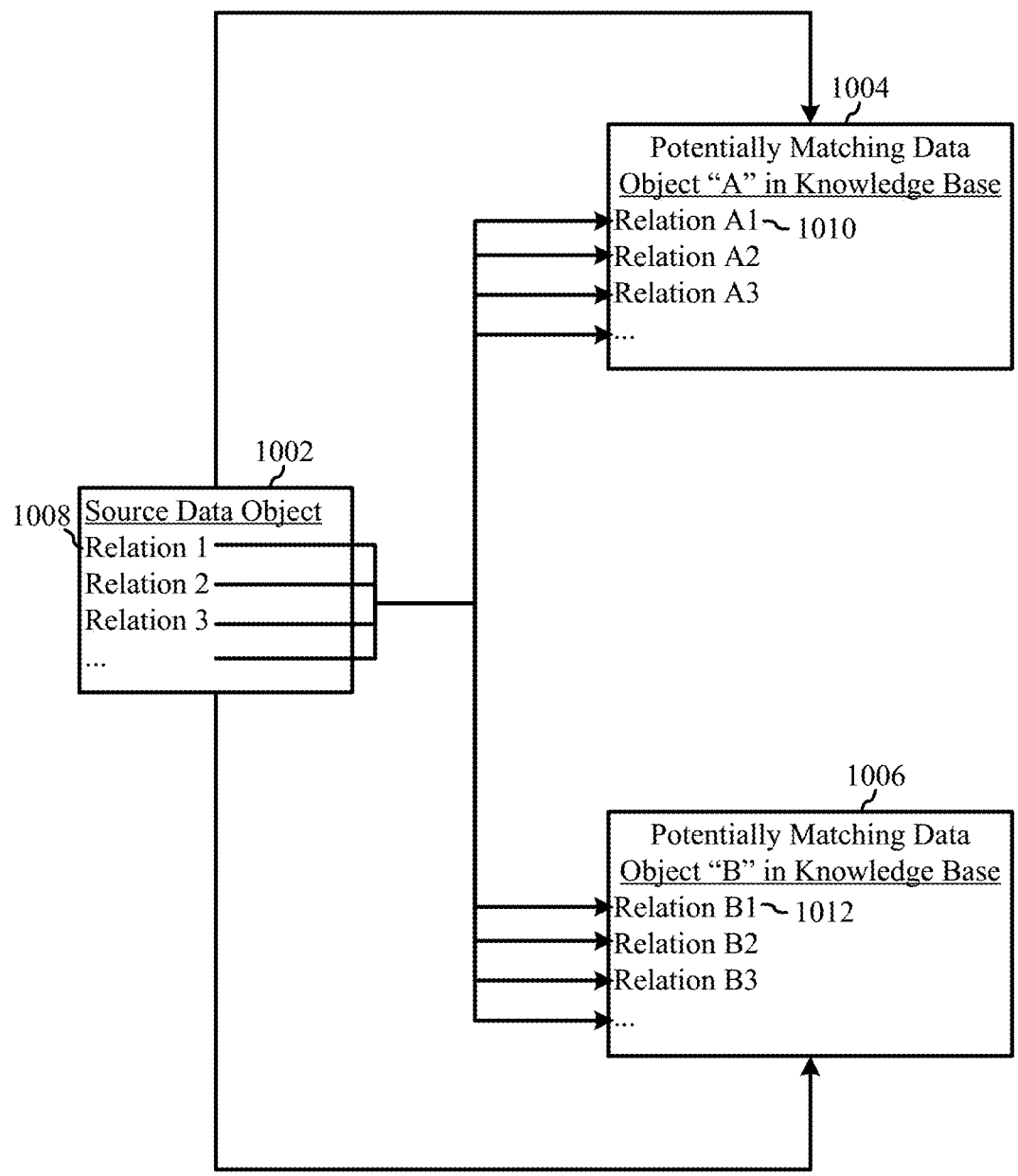
FIG. 10 illustrates an overview of resolving objects according to an aspect of the present disclosure.

The above methods may be repeated for each potentially matching data object in the knowledge base and for each potentially matching relation for each of the potentially matching data object in the knowledge base. FIG. 10 illustrates an exemplary overview of the comparison loops. As illustrated in FIG. 10, a source data object 1002 is compared to one or more data objects in the knowledge base. For example, the source data object 1002 is compared to a potentially matching data object "A" in the knowledge base 1004, and a potentially matching data object "B" in the knowledge base 1006. In this aspect, the systems and methods disclosed herein loop or repeat steps to compare each potentially matching data object in the knowledge base. Relations, such as 1008 of the source data object 1002, are also compared to relations, such as 1010 of the potentially matching data object "A" in the knowledge base 1004, and relation 1012 of the potentially matching data object "B" in the knowledge base 1006. In this aspect, the systems and methods disclosed herein loop or repeat steps to compare each relation or relation-side pair of each of the potentially matching data objects in the knowledge base.

Thus, the system and method may identify more than one potentially matching data object in the knowledge base as corresponding to or matching the source data object. When this occurs, additional review may be performed, and/or additional evidence, such as additional relations may be compared to identify a best or most likely match.

In an aspect, using the systems and methods described above, a number of examples are presented below. In one example, when two objects share a left-unique trusted key for the source and no contradictory evidence, the objects may receive a 100% match. In a second example, two objects with a common translation "Foobar," both [is an album by] [artist x], and no other contradictory evidence should be merged, because [is an album by] is close to right unique. In a second example, when three places A, B, and C called "London" have populations: A=1022, B=82 million, C=83 million, B should have a higher match score with C than with A. In a fourth example, when object "X" and object "Y" have a same common name ("Tom Smith", and there are 80 objects in the knowledge base with that common translation), and are both instances of [human being], have different birth dates and very few other facts each. The objects "X" and "Y" may be given a low but non-zero score.

In a fifth example, when object "X" and object "Y" have a same rare name ("Petunia Zula", and are the only objects in the knowledge base with that common translation), are both instances of [human being], both have a [biochemist] [is the main occupation of] fact, but have birthdates 2 years apart. The objects "X" and "Y" may be given a medium score, because the common translation is rare, [is the main occupation of] is quite far from right unique, but quite a small percentage of the facts in the knowledge base have the value [biochemist], and the difference in birthdates could be an error in the source or a valid indicator that they the objects "X" and "Y" different, and may require manual review. In a sixth example, when object "X" has an [is an album by] A fact, and object "Y" has an [is an audio publication by] A fact, and object "Z" has an [is an audio publication by] B fact, object "X" may be more likely to merge with object "Y" than with object "Z".

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As discussed above, the various embodiments may be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and protocols. Such a system also may include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of communication, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle, Microsoft, Sybase, and IBM.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad, or microphone), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system or device. Based on the disclosure and teachings provided herein, a person of ordinary skill in the art will appreciate other ways and/or methods to implement the various embodiments.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for resolving electronic data objects, the method comprising:
    receiving source data from an electronic data source, the source data including information about a source entity;
    representing the source data as a source data object formatted in a manner consistent with an existing electronic database, wherein the source data object indicates relations about the source entity and values corresponding to the relations;
    identifying an existing data object stored in the existing electronic database, wherein the existing data object includes information about an existing entity and the existing entity potentially matches the source entity;
    identifying a first relation between the source entity and a first value, the first relation including first text at a first position relative to second text corresponding to the first value;
    identifying a second relation between the existing entity and a second value, the second relation including third text at a second position relative to fourth text corresponding to the second value;
    determining that the first position relative to the second text is at least similar to the second position relative to the fourth text;
    comparing the first value and the second value;
    determining a positive score indicating a likelihood that the source entity is the existing entity based on a result of the comparing the first value and the second value;
    identifying a third relation between the source entity and a third value, the third relation including fifth text a third position relative to sixth text corresponding to the third value;
    identifying a fourth relation between the existing entity and a fourth value, the fourth relation including seventh text at a fourth position relative to eighth text corresponding to the fourth value;
    determining that the third position relative to the sixth text is at last similar to the fourth position relative to the eighth text;
    comparing the third value and the fourth value; and
    determining a negative score indicating a likelihood that the source entity is different from the existing entity based on a result of the comparing the third value and the fourth value.

2. The method of claim 1, further comprising:
    determining that the source entity is the existing entity based at least in part on the positive score and the negative score.

3. The method of claim 1, wherein:
    the positive score has a first weight representing a strength of the comparison of the first value to the second value; and
    the negative score has a second weight representing a strength of the comparison of the third value and the fourth value.

4. The method of claim 3, further comprising:
    determining a conflict score representing an uncertainty of whether the existing entity is the source entity based at least in part on the positive score, negative score, first weight, and second weight; and
    providing for further review of whether the existing entity is the source entity in response to the conflict score being above a threshold.

5. The method of claim 1, wherein the source data object includes at least one of a classifier, recognition data, a relation, a class, a positive fact, a negative fact, or a time.

6. A method for resolving electronic data objects, comprising:
    receiving source data from a first electronic data source, the source data including information about a source entity;
    representing the source data as a source data object;
    identifying an existing data object stored in an existing electronic database, wherein the existing data object includes information about an existing entity potentially matching the source entity;
    identifying a first relation between the source entity and a first value in the source data object, the first relation including first text at a first position relative to second text corresponding to the first value;
    identifying a second relation between the existing entity and a second value in the existing data object, the second relation including third text at a second position relative to fourth text corresponding to the second value;
    determining that the first position relative to the second text is at least similar to the second position relative to fourth text;
    comparing the first value and the second value; and
    determining a similarity score based at least in part on a result of the comparing, wherein the similarity score represents a likelihood that the source entity is the existing entity.

7. The method of claim 6, wherein identifying the existing data object comprises identifying the existing data object based at least in part on the source data object and the existing data object sharing one or more of a key, a common translation, a class, or a denotational string.

8. The method of claim 6, further comprising:
    identifying a class corresponding to the source data object and a class corresponding to the existing data object;
    comparing the class of the source data object with the class of the existing data object; and
    wherein the determining the similarity score is further based on a result of the comparing the class of the source data object with the class of the existing data object.

9. The method of claim 8, further comprising:
    increasing a positive score in response to the class of the source data object having an overlap with the class of the existing data object, wherein the positive score represents a likelihood that the source entity is the existing entity, or
    increasing a negative score in response to the class of the source data object conflicting with the class of the existing data object, wherein the negative score represents a likelihood that the source entity is not the existing entity.

10. The method of claim 6, further comprising:
increasing a positive score in response to the first value being substantially similar to the second value, wherein the positive score represents a likelihood that the source entity is the existing entity, or
increasing a negative score in response to the first value being substantially different than the second value, wherein the negative score represents a likelihood that the source entity is not the existing entity.

11. The method of claim 10, wherein:
the determining of the similarity score is based at least in part on the positive score, the negative score, and at least one weight value,
the at least one weight value representing a strength of a similarity between the first relation and the second relation considered in determining the positive and negative scores.

12. The method of claim 11, wherein the first relation and the second relation correspond to a relation-side pair; and
further comprising assigning a priority to the relation-side pair considered in determining the positive and negative scores, the priority based at least in part on a uniqueness of the relation-side pair.

13. The method of claim 12, wherein determining the similarity score is further based at least in part on the priority of the relation-side pair.

14. A computing system for resolving data objects, comprising:
a computing device in communication with a network, the computing device including at least one processor and a memory device including instructions operable to be executed by the at least one processor to perform a set of actions, configuring the at least one processor to:
to receive source data from a first electronic data source, the source data including information about a source entity;
to represent the source data as a source data object;
to identify an existing data object stored in an existing electronic database, wherein the existing data object includes information about an existing entity potentially matching the source entity;
to identify a first relation between the source entity and a first value in the source data object, the first relation including first text at a first position relative to second text corresponding to the first value;
to identify a second relation between the existing entity and a second value in the existing data object, the second relation including third text at a second position relative to fourth text corresponding to the second value;
to determine that the first position relative to the second text is at least similar to the second position relative to the fourth text;
to compare the first value and the second value; and
to determine a similarity score based at least in part on a result of the comparison, wherein the similarity score represents a likelihood that the source entity is the existing entity.

15. The system of claim 14, wherein the at least one processor is configured to identify the existing data object based at least in part on the source data object and the existing data object sharing one or more of a key, a common translation, a class, or a denotational string.

16. The system of claim 14, wherein the at least one processor is further configured:
to identify a class corresponding to the source data object and a class corresponding to the existing data object;
to compare the class of the source data object with the class of the existing data object; and
wherein the at least one processor is configured to determine the similarity score further based on a result of the comparing the class of the source data object with the class of the existing data object.

17. The system of claim 16, wherein the at least one processor is further configured:
to increase a positive score in response to the class of the source data object having an overlap with the class of the existing data object, wherein the positive score represents a likelihood that the source entity is the existing entity, or
to increase a negative score in response to the class of the source data object conflicting with the class of the existing data object, wherein the negative score represents a likelihood that the source entity is not the existing entity.

18. The system of claim 14, wherein the at least one processor is further configured:
to increase a positive score in response to the first value being substantially similar to the second value, wherein the positive score represents a likelihood that the source entity is the existing entity, or
to increase a negative score in response to the first value being substantially different than the second value, wherein the negative score represents a likelihood that the source entity is not the existing entity.

19. The system of claim 18, wherein:
the at least one processor is configured to determine the similarity score further based at least in part on the positive score, the negative score, and at least one weight value,
the at least one weight value representing a strength of a similarity between the first relation and the second relation considered in determining the positive and negative scores.

20. The system of claim 19, wherein the first relation and the second relation correspond to a relation-side pair; and wherein the at least one processor is further configured to assign a priority to the relation-side pair considered in determining the positive and negative scores, the priority based at least in part on a uniqueness of the relation-side pair.

21. The system of claim 20, wherein the at least one processor is configured to determine the similarity score further based at least in part on the priority of the relation-side pair.

* * * * *